United States Patent
Duggan et al.

(10) Patent No.: US 7,426,713 B2
(45) Date of Patent: Sep. 16, 2008

(54) CONTROLLING A GUI DISPLAY FOR A PLUG-IN

(75) Inventors: Matthew Paul Duggan, Austin, TX (US); Dolapo Martin Falola, Austin, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/815,214

(22) Filed: Mar. 31, 2004

(65) Prior Publication Data
US 2005/0223375 A1    Oct. 6, 2005

(51) Int. Cl.
*G06F 9/44* (2006.01)

(52) U.S. Cl. .................................................... 717/100

(58) Field of Classification Search ......... 717/104–109, 717/140–143, 116, 120, 100
See application file for complete search history.

(56) References Cited

U.S. PATENT DOCUMENTS

| | | | |
|---|---|---|---|
| 6,476,828 B1 | 11/2002 | Burkett et al. | |
| 6,728,750 B1 * | 4/2004 | Anderson et al. | 709/201 |
| 6,772,408 B1 * | 8/2004 | Velonis et al. | 717/100 |
| 6,877,134 B1 * | 4/2005 | Fuller et al. | 715/500.1 |
| 6,990,645 B2 * | 1/2006 | Lichtensteiger et al. | 716/6 |
| 6,996,800 B2 * | 2/2006 | Lucassen et al. | 717/106 |
| 7,047,518 B2 * | 5/2006 | Little et al. | 717/108 |
| 7,058,899 B2 * | 6/2006 | Petruk et al. | 715/763 |
| 7,065,744 B2 * | 6/2006 | Barker et al. | 717/109 |
| 7,093,191 B1 * | 8/2006 | Jain et al. | 715/501.1 |
| 7,111,079 B2 * | 9/2006 | Cheng | 709/249 |
| 7,127,702 B2 * | 10/2006 | Seki | 717/107 |
| 7,177,793 B2 * | 2/2007 | Barker et al. | 704/8 |
| 7,188,345 B2 * | 3/2007 | Gilfix et al. | 719/313 |
| 7,191,404 B2 * | 3/2007 | Barker et al. | 715/760 |
| 7,240,326 B2 * | 7/2007 | Barker et al. | 717/105 |
| 7,251,777 B1 * | 7/2007 | Valtchev et al. | 715/513 |
| 7,281,236 B1 * | 10/2007 | Galvin et al. | 717/104 |
| 2002/0029340 A1 * | 3/2002 | Pensak et al. | 713/182 |
| 2002/0085020 A1 | 7/2002 | Carroll, Jr. | |
| 2003/0107597 A1 | 6/2003 | Jameson | |
| 2003/0193521 A1 | 10/2003 | Chen et al. | |

FOREIGN PATENT DOCUMENTS

| | | |
|---|---|---|
| GB | 2 350 990 A | 12/2000 |
| WO | WO 01/98926 A2 | 12/2001 |

* cited by examiner

*Primary Examiner*—Wei Y. Zhen
*Assistant Examiner*—Philip Wang
(74) *Attorney, Agent, or Firm*—John Biggers; Jeffrey S. LaBaw; Biggers & Ohanian, LLP (57) ABSTRACT

Methods, systems, and computer program products are provided for controlling a GUI display for a plug-in in an application supporting plug-ins. Embodiments include receiving, at run time, in the application from the plug-in a request to display a GUI object; responsive to the request, retrieving an XML representation of the GUI object; and displaying the GUI object in dependence upon the retrieved XML representation of the GUI object. Typical embodiments also include receiving from the plug-in a request to retrieve user input responsive to the GUI object; and returning to the plug-in responsive user input.

12 Claims, 5 Drawing Sheets

CONTROLLING A GUI DISPLAY FOR A PLUG-IN

BACKGROUND OF THE INVENTION

1. Field of the Invention

The field of the invention is data processing, or, more specifically, methods, systems, and products for controlling a GUI display for a plug-in.

2. Description of Related Art

Many software infrastructures allow customers to write custom pluggable software components ("plug-ins") to meet their individual software needs. If a single static graphical user interface ("GUI") manages the software system, plug-ins are not able to use the product's GUI because such GUIs do not extend interfaces through applications so as to make GUI functions accessible to plug-ins. GUIs often do not extend interfaces through applications so as to make GUI functions accessible to plug-ins because an application supporting plug-ins often has a proprietary look and fell effected through its GUI, a proprietary look and feel that may be the subject of considerable investment on the part of its developer. Some applications support plug-ins with text-based configuration files or even hard code configuration parameters, requiring recompilation of the application in order to incorporate a plug-in. Other applications use web services portlets to support GUIs, requiring development of separate GUI functions for the plug-ins. Both these approaches risk GUI style differences from the supporting application because they both put full GUI control in the hands of the plug-in. GUI styles in plug-ins that differ from the GUI style of a supporting application are undesirable because the hosting parent supporting application may lose control of the overall look and feel of its GUI presentation to users.

SUMMARY OF THE INVENTION

Methods, systems, and products are disclosed to provide GUI extensibility into an application supporting plug-ins so that a plug-in developer can use GUI functions whose operations may be controlled by the application so as to maintain the consistent look and feel of a particular application. More particularly, methods, systems, and computer program products are provided for controlling a GUI display for a plug-in in an application supporting plug-ins. Embodiments include receiving, at run time, in the application from the plug-in a request to display a GUI object; responsive to the request, retrieving an XML representation of the GUI object; and displaying the GUI object in dependence upon the retrieved XML representation of the GUI object. Typical embodiments also include receiving from the plug-in a request to retrieve user input responsive to the GUI object; and returning to the plug-in responsive user input.

Typical embodiments of the invention also include installing the plug-in in the application, including configuring the application with the location of at least one XML representation of at least one GUI object. Typical embodiments also include providing through the application for the plug-in access to a subset of a set of GUI objects supported by a GUI environment. Many embodiments include providing GUI functions for the plug-in through a GUI API in the application, wherein receiving, at run time, in the application from the plug-in a request for display of a GUI object includes receiving a GUI API call from the plug-in. Typical embodiments include parsing the retrieved representation of the GUI object, wherein displaying the GUI object include displaying the GUI object in dependence upon the parsed representation of the GUI object. Typical embodiments also include publishing XML syntax for representing XML GUI objects operable by a plug-in through the application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for controlling a GUI display for a plug-in. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, transmission media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Controlling a GUI Display for a Plug-in

Figure 1:
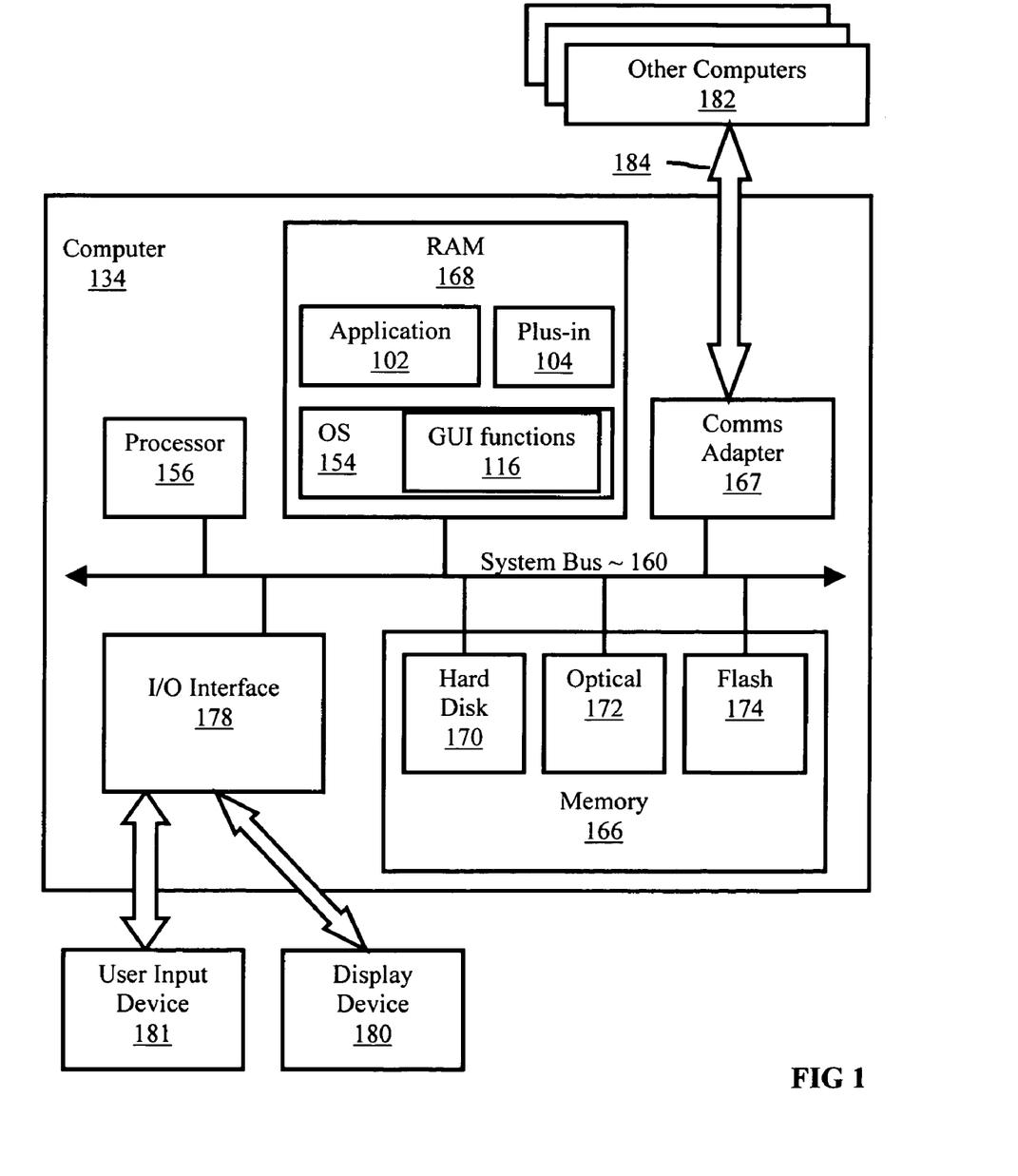
FIG. 1 sets forth a block diagram of automated computing machinery useful in controlling a GUI display for a plug-in in an application supporting plug-ins according to embodiments of the present invention.

Methods, systems, and computer program products for controlling a GUI display for a plug-in in an application supporting plug-ins are described with reference to the drawings beginning with FIG. 1. FIG. 1 sets forth a block diagram of automated computing machinery represented as a computer (134) useful in controlling a GUI display for a plug-in in an application supporting plug-ins according to embodiments of the present invention. The computer (134) of FIG. 1 includes at least one computer processor (156) or 'CPU' as well as random access memory (168) ("RAM"). Stored in RAM (168) is an application program (152) and a plug-in (104). Application programs include particular computer software instructions for controlling a GUI display for a plug-in in accordance with embodiments of the present invention. A plug-in hardware or software module typically adds a specific feature or service to an application.

The application (102) of FIG. 1 operates generally by receiving, at run time, from the plug-in a request to display a GUI object; retrieving an XML representation of the GUI object; and displaying the GUI object in dependence upon the retrieved XML representation of the GUI object. In the example of FIG. 1, the application (102) has standards of appearance for its GUI display, and the application (102) may operate in computer (134) by retrieving an XML representation of a GUI object that complies with the application's standards of appearance for the GUI display. By having standards of appearance and retrieving for requesting plug-ins XML representations of GUI objects that comply with the application's standards of appearance, application (102) maintains control of the overall look and feel of its GUI presentation to users. Any application may support a plug-in. Examples of applications that often support plug-ins are email clients such as Microsoft Outlook™ and browsers such as Microsoft Internet Explorer™. Popular plug-ins for Internet Explorer include, for example: the Flash™ plug-in from Macromedia, Inc.; the QuickTime™ plug-in from Apple Computer, Inc., and the RealPlayer™ plug-in from RealNetworks, Inc.

Also stored in RAM (168) is an operating system (154). Operating systems useful in computers according to embodiments of the present invention include Unix, Linux, Microsoft NT™, and many others as will occur to those of skill in the art. As discussed in more detail below, operating system (154) includes GUI functions (116) operable through an application programming interface ("API") provided by the operating system.

The computer (134) of FIG. 1 includes computer memory (166) coupled through a system bus (160) to processor (156) and to other components of the computer. Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer (134) of FIG. 1 includes a communications adapter (167) for implementing connections for data communications (184), including connection through networks, to other computers (182), servers, clients, administrative devices, or sleeping devices. Communications adapters implement the hardware level of connections for data communications through which local devices and remote devices or servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 1 includes one or more input/output interface adapters (178). Input/output interface adapters in computers implement user-oriented input/output through, for example, software drivers and computer hardware such as graphics adapters for controlling output to display devices (180) such as computer display screens, as well as user input from user input devices (181) such as keyboards and mice. GUI functions (116) operate graphics adapters to provide GUI environments for applications and plug-ins.

Figure 2:
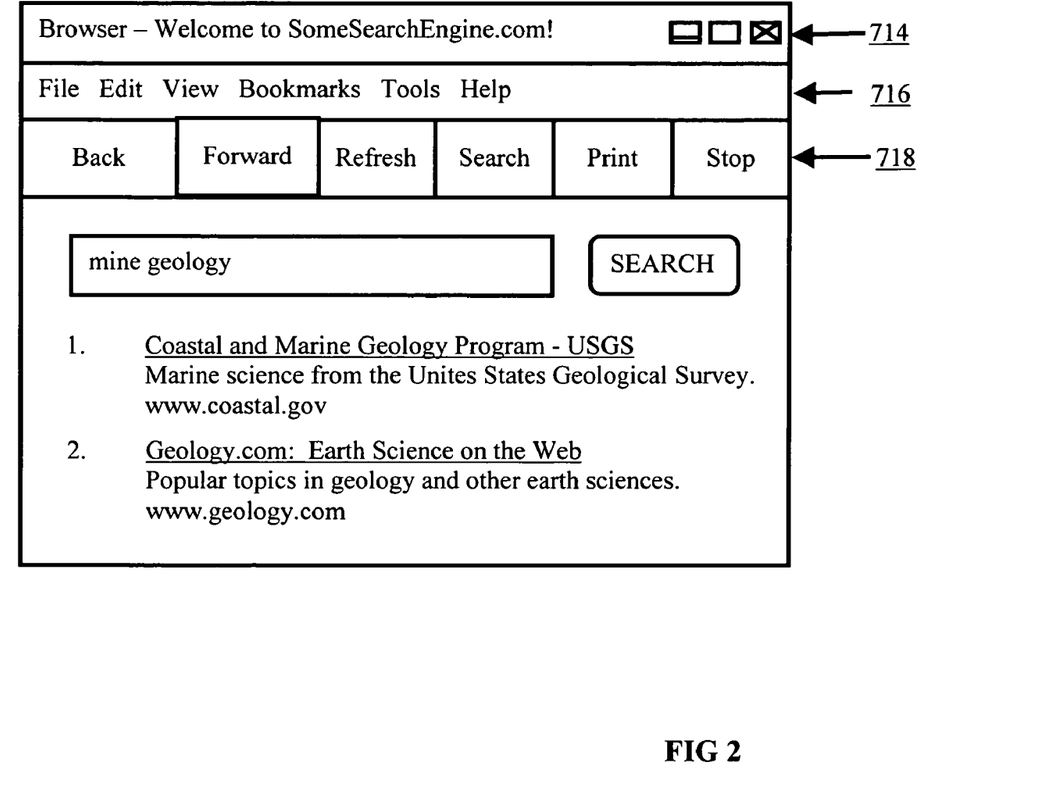
FIG. 2 depicts a graphical user interface ("GUI") running an exemplary browser.

The term "GUI object" is used in this specification as a generic term for a part of a GUI that allows the user to interface with the application and operating system. GUI objects display information and support user interaction with the GUI. Examples of GUI objects include buttons, dialog boxes, pop-up windows, pull-down menus, icons, scroll bars, resizable window edges, progress indicators, selection boxes, windows, tear-off menus, menu bars, toggle switches, forms and other GUI objects that will occur to those of skill in the art. For further explanation of GUI objects, refer to FIG. 2 which depicts a graphical user interface ("GUI") on a local host running an exemplary data communication application, more particularly, in the example of FIG. 2, a browser. The browser of FIG. 2 includes a GUI toolbar (718) with a Back button, a Forward button, and buttons for refreshing the display, searching, printing, and stopping web page retrievals, each of which is a GUI object. The browser of FIG. 2 also includes a horizontal menu (716) containing the menu items File, Edit, View, Bookmark (called 'Favorites' on some browsers), Tools, and Help. The horizontal menu (716) is a GUI object and each of the menu items is also a GUI object. The browser of FIG. 2, as depicted, has been operated to point to a web site named "SomeSearchEngine.com," as shown in the title bar of the browser display (714). The title bar is the title bar for a GUI window. The GUI window is a GUI object and the title bar is a GUI object.

Figure 3:
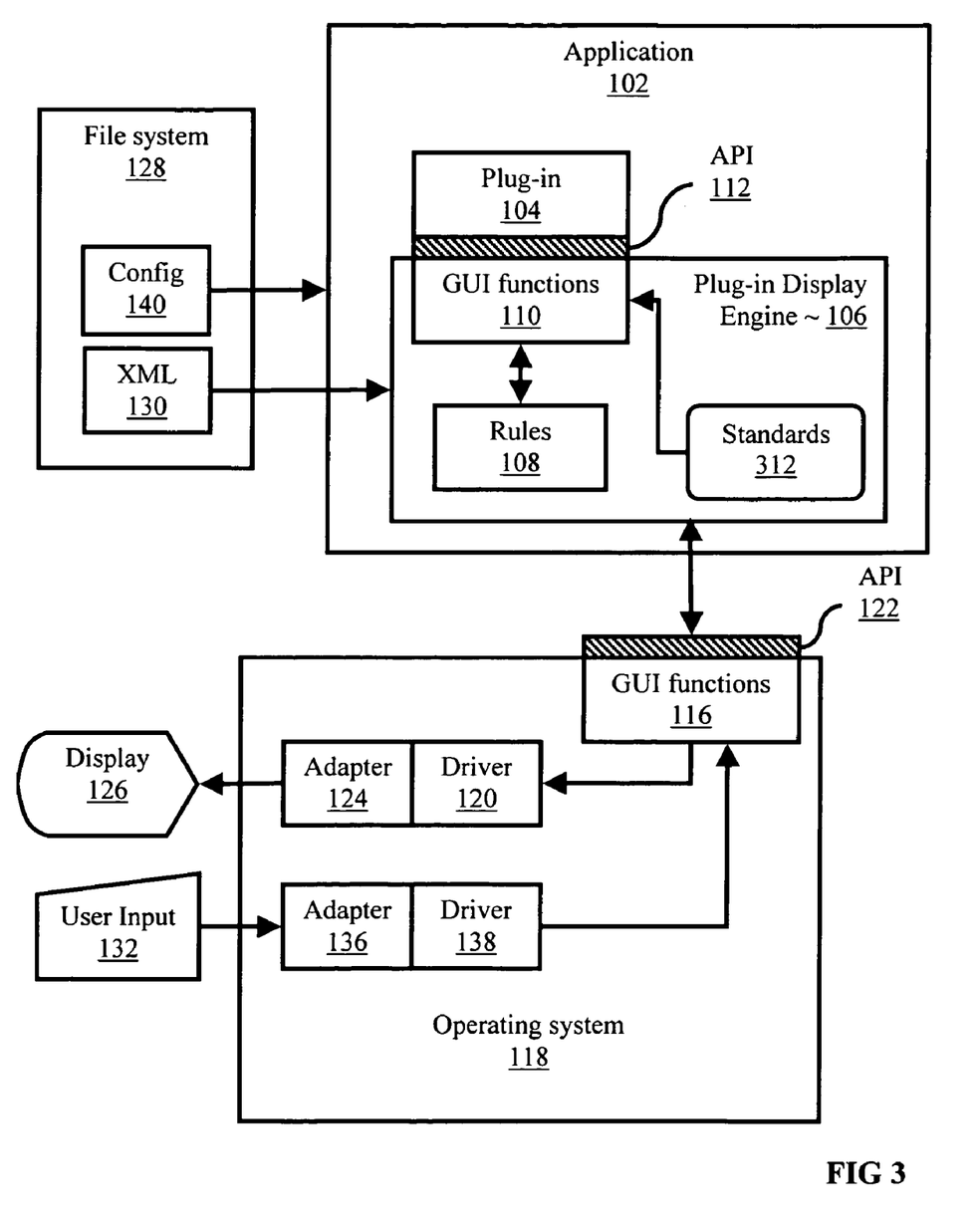
FIG. 3 sets forth a block diagram illustrating an exemplary system for controlling a GUI display for a plug-in in an application supporting plug-ins.

FIG. 3 sets forth a block diagram illustrating an exemplary system for controlling a GUI display (126) for a plug-in (104) in an application (102) supporting plug-ins. The exemplary system of FIG. 3 a plug-in installed in the application, by configuring (140) the application with the location of the software components of the plug-in and the location of at least one XML representation (130) of at least one GUI object. Although FIG. 3 depicts only one XML representation, GUI objects include further GUI objects and the XML representation of such a GUI object may include XML representations of the further GUI objects. XML representations of GUI objects include XML representations of attributes and elements of GUI objects. The configuration (140) and the XML representation (130) are depicted in FIG. 3 as located in a file system (128). The exemplary plug-in of FIG. 3 is shown within the application (102).

The locations within the computer system of the application configuration data (140), the XML representation (130) of GUI objects, and the plug-in (104) are not limitations of the invention. The file system (128), the configuration data (140), the XML representation (130), and the plug-in (104) can be located anywhere in cyberspace that can be located with a Universal Resource Locator ("URL"). Some applications, for example, expose an API for GUI functions through a web services portlet, and in such systems a plug-in may execute on another computer located remotely across a network from the computer the application is on.

Figure 4:
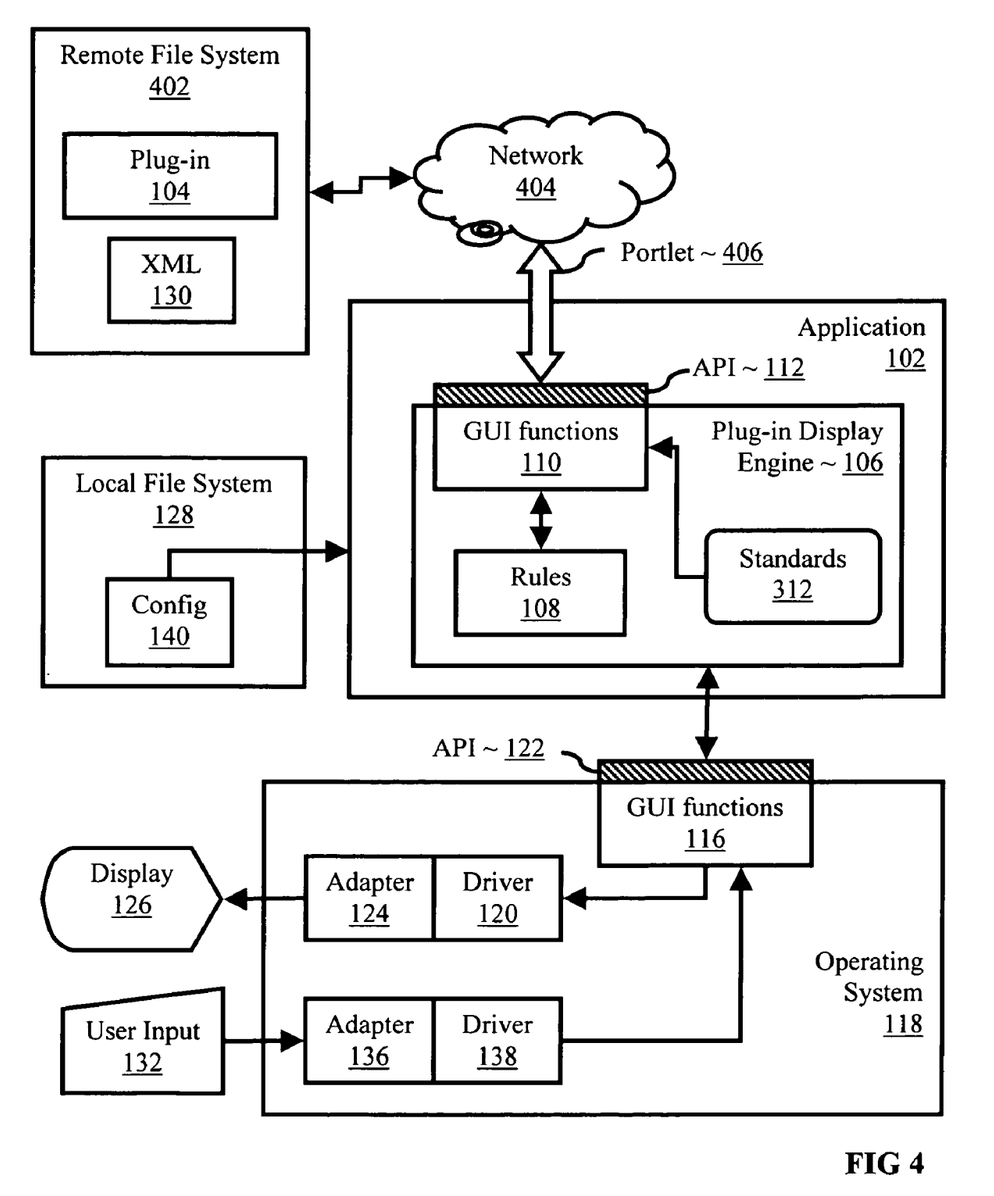
FIG. 4 sets forth a block diagram illustrating an exemplary system architecture, useful in various embodiments of the present invention for controlling a GUI display for a plug-in in an application supporting plug-ins.

FIG. 4 sets forth a block diagram illustrating an exemplary system architecture, useful in various embodiments of the present invention for controlling a GUI display (126) for a plug-in (104) in an application (102) supporting plug-ins, in which a configuration file (140) for an application is stored on a file system (128) local to the application, and a plug-in (104) and an XML representation (130) of GUI objects for the plug-in are located on a remote file system connected to the application through network (404). In the example of FIG. 4, the locations of plug-in (104) and XML representation (130) are configured for the application as URLs (not shown) listed in the application's configuration file (140).

FIG. 3 and FIG. 4 illustrated two exemplary architectural arrangements for locating plug-ins and associated XML representations of GUI objects with respect to the locations of applications. Other architectural arrangements for controlling a GUI display (126) for a plug-in (104) in an application (102) supporting plug-ins will occur to those of skill in the art, and all such architectures are well within the scope of the present invention.

Both of the exemplary systems of FIGS. 3 and 4 operate generally by receiving, at run time, in the application from the plug-in a request to display a GUI object; retrieving an XML representation (130) of the GUI object in response to the request; and displaying the GUI object in dependence upon the retrieved XML representation of the GUI object. In both of the illustrated exemplary systems of FIGS. 3 and 4, application (102) has standards of appearance (312) for its GUI display (126), and retrieving an XML representation (130) of the GUI object is carried out by retrieving an XML representation (130) of the GUI object that complies with the application's standards of appearance (312) for the GUI display (126). By having standards of appearance and retrieving for requesting plug-ins XML representations of GUI objects that comply with the application's standards of appearance (312), application (102) in the system of FIG. 3 and in the system of FIG. 4 maintains control of the overall look and feel of its GUI presentation to users.

The application (102) of FIG. 3 includes a plug-in display engine (106). The plug-in display engine (106) includes GUI functions (110). A GUI function is a software routine that displays and administers GUI objects, displaying GUI objects on displays (126) operated through GUI adapters (124) and adapter drivers (120) and retrieving user input (132) through input adapters (136) such as, for example, mouse adapters and keyboard adapters operated by input adapter drivers (138). The plug-in display engine (106) exposes an API (112) for the plug-in (104) to use in accessing the GUI functions (110). The plug-in display engine also includes rules (108) governing the scope of the GUI functionality that is made accessible to the plug-in (104). Examples of rules (108) governing the scope of the GUI functionality that is made accessible to the plug-in (104) include:

a plug-in may display tool bar widgets only
a plug-in may display GUI objects only in a predefined area of a display screen
a plug-in may display GUI objects using a predefined set of colors.

The plug-in display engine (106) of FIG. 3 operates generally by providing through the application (102) for the plug-in (104) access to a subset of a set of GUI objects supported by a GUI environment. In the example of FIG. 3, an overall GUI environment is provided by an operating system (118) which provides GUI functions (116). The GUI functions (116) of the operating system (118) are accessible to the application (102) through an API (122) exposed to the application by the operating system (118). Subject to the rules (108), the plug-in display engine (106) provides through its GUI functions (110) all or a portion of the GUI functions (116) of the overall GUI environment. While in the example of FIG. 3, the operating system (118) provides the overall GUI environment for the application (102), this is not a limitation of the scope of the invention. GUI environments may be provided by applications, as a toolset at the application level outside the operating system or any other application, and otherwise as will occur to those of skill in the art.

As just mentioned above, the plug-in display engine of FIG. 3 (106) provides through its GUI functions (110) all or a portion of the GUI functions (116) of the overall GUI environment. Because a plug-in display engine may not support all the GUI functions of a particular GUI environment like a particular operating system for example, developers of applications that support plug-ins according to the present invention can publish a list of GUI objects supported by the application, the list comprising a subset of the set of GUI objects supported by a GUI environment. A list of supported GUI objects advantageously allows plug-in developers to write plug-ins for applications that support plug-in according to embodiments of the present invention. Developers of applications supporting plug-ins may advantageously publish XML syntax for representing XML GUI objects operable by a plug-in through the application. Exemplary ways of publishing XML syntax for representing XML GUI objects include XML Document Type Definitions ("DTDs") and XML schema. Such a DTD or schema may be published by storing the DTD or schema at a location in cyberspace, such as, for example, a location identified by a URL such as: http://www.gui.obj/guiObjects/syntax.dtd. Then, when a DTD named "syntax.dtd" is stored at the location identified by that URL, any XML document can use that DTD to determine syntax for representing GUI object by including these declarations in the XML document, for example:

```
<?xml version="1.0"?>
<!DOCTYPE guiObjects SYSTEM
    "http://www.gui.obj/guiObjects/syntax.dtd">
```

The exemplary system of FIG. 3 operates generally by providing GUI functions (110) for the plug-in (104) through a GUI API (112) in the application (102). At run time, the plug-in requests display of GUI objects by calling GUI functions through the API (112). The plug-in display engine (106) receives requests for display of GUI objects as GUI API calls from the plug-in (104). In response to requests for display of GUI objects, the plug-in display engine (106) of FIG. 3 retrieves XML representations (130) of the GUI objects from a file system (128) and displays the GUI objects in dependence upon the retrieved XML representations by calling GUI functions (116) in the operating system (118) through an API (122). In the example of FIG. 3, the GUI functions (116) display the GUI objects through a driver (120) and an adapter (124).

In the example of FIG. 3, the plug-in display engine also receives from the plug-in (104) requests to retrieve user input (132) responsive to displayed GUI objects. Requests to retrieve user input may be implemented synchronously as blocking calls that wait for user input. Alternatively, requests to retrieve user input may be implemented as calls that register the plug-in or a software object in the plug-in as a listener with the plug-in display engine (106). The plug-in display engine (106) returns to the plug-in responsive user input made available to the plug-in display engine through an adapter (136), driver (138) and GUI functions (116) in the operating system.

Figure 5:
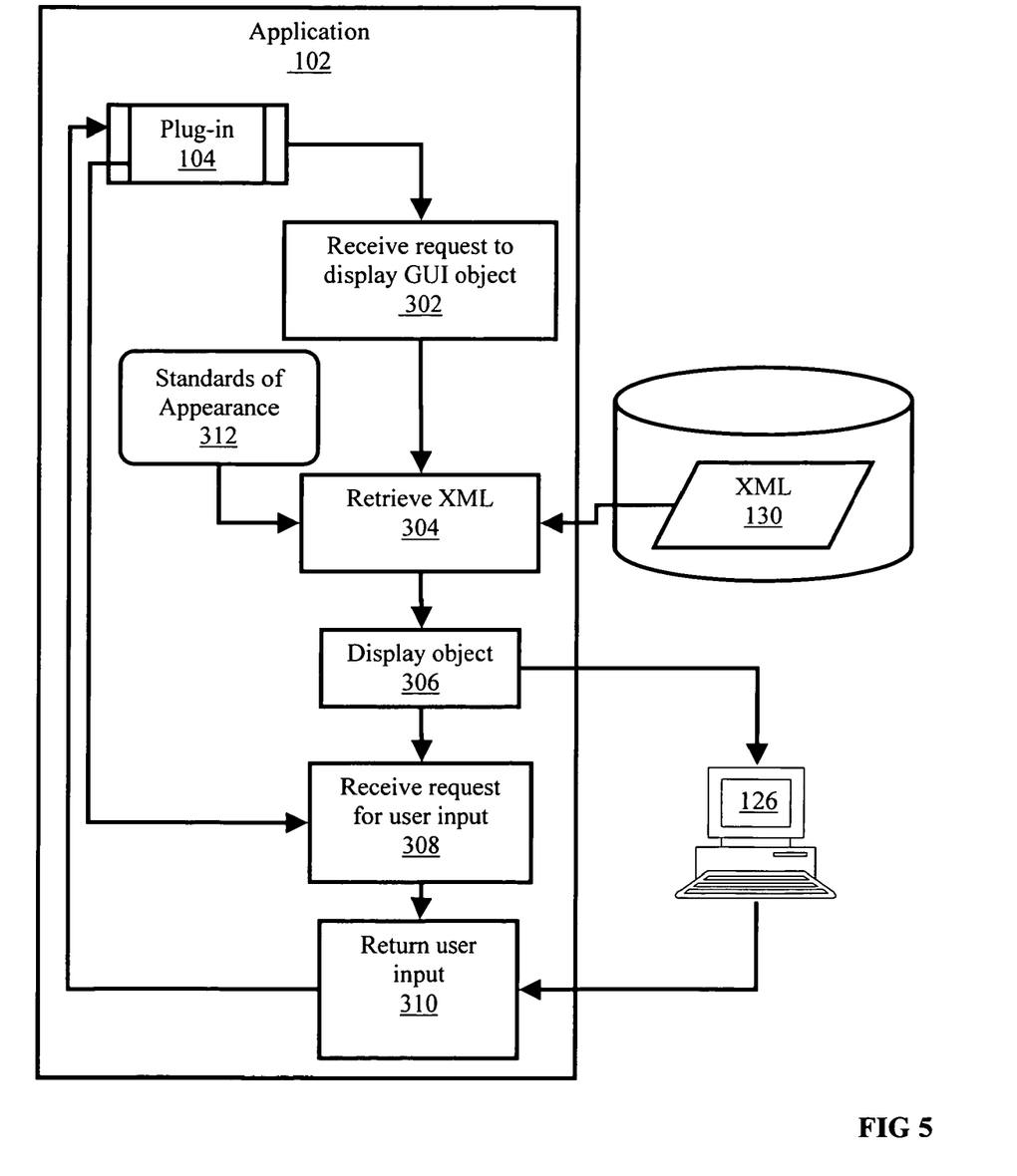
FIG. 5 sets forth a flow chart illustrating an exemplary method for controlling a GUI display for a plug-in in an application supporting plug-ins.

FIG. 5 sets forth a flow chart illustrating an exemplary method for controlling a GUI display (126) for a plug-in (104) in an application (102) supporting plug-ins that includes receiving (302), at run time, in the application from the plug-in a request to display a GUI object and retrieving (304) an XML representation (130) of the GUI object in response to the request. In the example of FIG. 5, the application (102) has standards of appearance (312) for the GUI display, and retrieving an XML representation of the GUI object is carried out by retrieving an XML representation of the GUI object that complies with the application's standards of appearance (312) for the GUI display (126). By having standards of appearance and retrieving for requesting plug-ins XML representations of GUI objects that comply with the application's standards of appearance (312), application (102) maintains control of the overall look and feel of its GUI presentation to users.

The method of FIG. 5 also includes parsing the retrieved representation of the GUI object, where displaying the GUI object further comprises displaying the GUI object in dependence upon the parsed representation of the GUI object. Here is an example of an XML representation of GUI objects:

```
<window title="MyWindow" location="0,0" size= "200,300">
    <dialogBox displayText= "Display Something?>
        <button type=YesButton />
        <button type=NoButton />
    </dialogBox>
</window>
```

This example describes a window entitled "MyWindow" configured to display in the top left area of a display screen sized at 200 by 300 pixels. The window is represented to contain a dialogue box that will display the text "Display Something?" The dialogue box is represented to contain two buttons, a Yes button and a No button. The method of FIG. 5 also includes displaying (306) the GUI object in dependence upon the retrieved XML representation of the GUI object. A plug-in display engine is unlikely to operate directly against XML in text form, however. The exemplary XML representation of a window may therefore be parsed, for example, into the following structure expressed, for example, in C, C++, or Java:

```
struct GUI_STRUCTURE
{
    TypeCode type = WINDOW;
    string title = "MyWindow";
    int locationX = 0;
    int location Y = 0
    int sizeX = 200;
    int sizeY = 300;
    struct
    {
        TypeCode type = DIALOGUE_BOX;
        string displayText = "Display Something?";
        struct
        {
            TypeCode type = YES_BUTTON;
        }
        struct
        {
            TypeCode type = NO_BUTTON;
        }
    }
};
```

The method of FIG. 5 also includes receiving (308) from the plug-in (104) a request to retrieve user input responsive to the GUI object and returning (310) to the plug-in responsive user input. In the GUI window described above, for example, user input may select or operate one of the buttons to display something or refrain from displaying something.

In view of these descriptions of exemplary embodiments, readers will recognize that embodiments of the present invention advantageously provide GUI extensibility into an application supporting plug-ins so that a plug-in developer can use GUI functions whose operations may be controlled by the application so as to maintain the consistent look and feel of an application. It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for controlling a GUI display for a plug-in in an application supporting plug-ins, the system comprising:
   a memory and a processor;
   means for installing the plug-in in the application, including means for configuring the application with a location of at least one XML representation of at least one GUI object;
   means for receiving, at run time, in the application from the plug-in a request to display a GUI object, wherein the application has standards of appearance for the GUI display;
   means for retrieving an XML representation of the GUI object in response to the request that complies with the application's standards of appearance for the GUI display from the location; and
   means for displaying the GUI object in dependence upon the retrieved XML representation of the GUI object.

2. The system of claim 1 further comprising means for providing through the application for the plug-in access to a subset of a set of GUI objects supported by a GUI environment.

3. The system of claim 1 further comprising means for providing GUI functions for the plug-in through a GUI API in the application, wherein means for receiving, at run time, in the application from the plug-in a request for display of a GUI object further comprises means for receiving a GUI API call from the plug-in.

4. The system of claim 1 further comprising:
   means for receiving from the plug-in a request to retrieve user input responsive to the GUI object; and
   means for returning to the plug-in responsive user input.

5. The system of claim 1 further comprising means for parsing the retrieved representation of the GUI object, wherein means for displaying the GUI object further comprises means for displaying the GUI object in dependence upon the parsed representation of the GUI object.

6. The system of claim 1 further comprising means for publishing XML syntax for representing XML GUI objects operable by a plug-in through the application.

7. A computer program product stored in a computer recording medium for controlling a GUI display for a plug-in in an application supporting plug-ins, the computer program product comprising:
   a recording medium;
   means, recorded on the recording medium, for installing the plug-in in the application, including means for configuring the application with a location of at least one XML representation of at least one GUI object;

means, recorded on the recording medium, for receiving, at run time, in the application from the plug-in a request to display a GUI object, wherein the application has standards of appearance for the GUI display; means, recorded on the recording medium, for retrieving an XML representation of the GUI object in response to the request that complies with the application's standards of appearance for the GUI display from the location; and means, recorded on the recording medium, for displaying the GUI object in dependence upon the retrieved XML representation of the GUI object.

8. The computer program product of claim 7 further comprising means, recorded on the recording medium, for providing through the application for the plug-in access to a subset of a set of GUI objects supported by a GUI environment.

9. The computer program product of claim 7 further comprising means, recorded on the recording medium, for providing GUI functions for the plug-in through a GUI API in the application, wherein means, recorded on the recording medium, for receiving, at run time, in the application from the plug-in a request for display of a GUI object further comprises means, recorded on the recording medium, for receiving a GUI API call from the plug-in.

10. The computer program product of claim 7 further comprising:

means, recorded on the recording medium, for receiving from the plug-in a request to retrieve user input responsive to the GUI object; and means, recorded on the recording medium, for returning to the plug-in responsive user input.

11. The computer program product of claim 7 further comprising means, recorded on the recording medium, for parsing the retrieved representation of the GUI object, wherein means, recorded on the recording medium, for displaying the GUI object further comprises means, recorded on the recording medium, for displaying the GUI object in dependence upon the parsed representation of the GUI object.

12. The computer program product of claim 7 further comprising means, recorded on the recording medium, for publishing XML syntax for representing XML GUI objects operable by a plug-in through the application.

* * * * *